United States Patent
Jemaa et al.

(10) Patent No.: US 8,152,956 B2
(45) Date of Patent: Apr. 10, 2012

(54) USE OF CHEMICAL PULP MILL STEAM STRIPPER OFF GASES CONDENSATE AS REDUCING AGENT IN CHLORINE DIOXIDE PRODUCTION

(75) Inventors: Naceur Jemaa, Pointe-Claire (CA); Michael Paleologou, Beaconsfield (CA); George Sacciadis, Laval (CA); Richard M. Berry, Notre Dame de L'Ile Perrot (CA)

(73) Assignee: Fpinnovations, Pointe Claire, QC (CA)

( * ) Notice: Subject to any disclaimer, the term of this patent is extended or adjusted under 35 U.S.C. 154(b) by 0 days.

(21) Appl. No.: 12/734,846

(22) PCT Filed: Nov. 12, 2008

(86) PCT No.: PCT/CA2008/002010
§ 371 (c)(1),
(2), (4) Date: May 27, 2010

(87) PCT Pub. No.: WO2009/079746
PCT Pub. Date: Jul. 2, 2009

(65) Prior Publication Data
US 2010/0263816 A1  Oct. 21, 2010

Related U.S. Application Data

(60) Provisional application No. 61/006,156, filed on Dec. 26, 2007.

(51) Int. Cl.
*D21C 9/14* (2006.01)
(52) U.S. Cl. ............................ 162/67; 423/477; 423/488
(58) Field of Classification Search ...................... 162/67
See application file for complete search history.

(56) References Cited

U.S. PATENT DOCUMENTS 2,376,935 A    5/1945  Persson
2,830,869 A    4/1958  Limerick
(Continued)

FOREIGN PATENT DOCUMENTS

CA    2003416    5/1990
(Continued)

OTHER PUBLICATIONS

Gullichsen editor, Chemical Pulping 6B, 1999, Fapet Oy, p. B7-B9, B39-B40, B53-B55, B68, B391, B396-B401.*

*Primary Examiner* — Matthew Daniels
*Assistant Examiner* — Anthony Calandra
(74) *Attorney, Agent, or Firm* — Norton Rose Canada LLP

(57) ABSTRACT

Steam stripper off gas from chemical pulp mills, for example kraft or sulphite pulp mills is rich in methanol and totally reduced sulphur (TRS) compounds. This gaseous stream is usually burned to avoid further handling of this TRS-rich, odorous stream. We found that once this gaseous stream is condensed, it can be used as a reducing agent in the chlorine dioxide generator, in place of purchased methanol. Surprisingly, we found that, in addition to the methanol component, the TRS components act as reducing agents during the production of chlorine dioxide or, at the very least, do not consume chlorine dioxide. The use of this stream in the $ClO_2$ generator will allow pulp mills to reduce or eliminate the consumption of purchased methanol while providing a new approach to deal with TRS compounds in the chlorine dioxide generator rather than employing a dedicated TRS incinerator or any other combustion device.

17 Claims, 2 Drawing Sheets

U.S. PATENT DOCUMENTS

| | | |
|---|---|---|
| 3,442,778 A | 5/1969 | Westerlund |
| 4,098,639 A | 7/1978 | Noreus et al. |
| 4,145,401 A | 3/1979 | Swindells et al. |
| 4,431,617 A | 2/1984 | Farin |
| 4,465,658 A | 8/1984 | Fredette |
| 4,473,540 A | 9/1984 | Fredette |
| 4,961,918 A | 10/1990 | Norell et al. |
| 5,066,477 A | 11/1991 | Zell et al. |
| 5,547,543 A | 8/1996 | Nykanen et al. |
| 5,676,920 A | 10/1997 | Lipsztajn |
| 5,830,314 A * | 11/1998 | Mattsson ............ 159/17.1 |
| 5,989,394 A | 11/1999 | Johansson et al. |
| 6,579,506 B2 | 6/2003 | Spink et al. |
| 2010/0122784 A1* | 5/2010 | Jemaa et al. ............ 162/14 |

FOREIGN PATENT DOCUMENTS

| | | |
|---|---|---|
| CA | 2357548 | 6/2000 |
| WO | 91/19668 | 12/1991 |

* cited by examiner

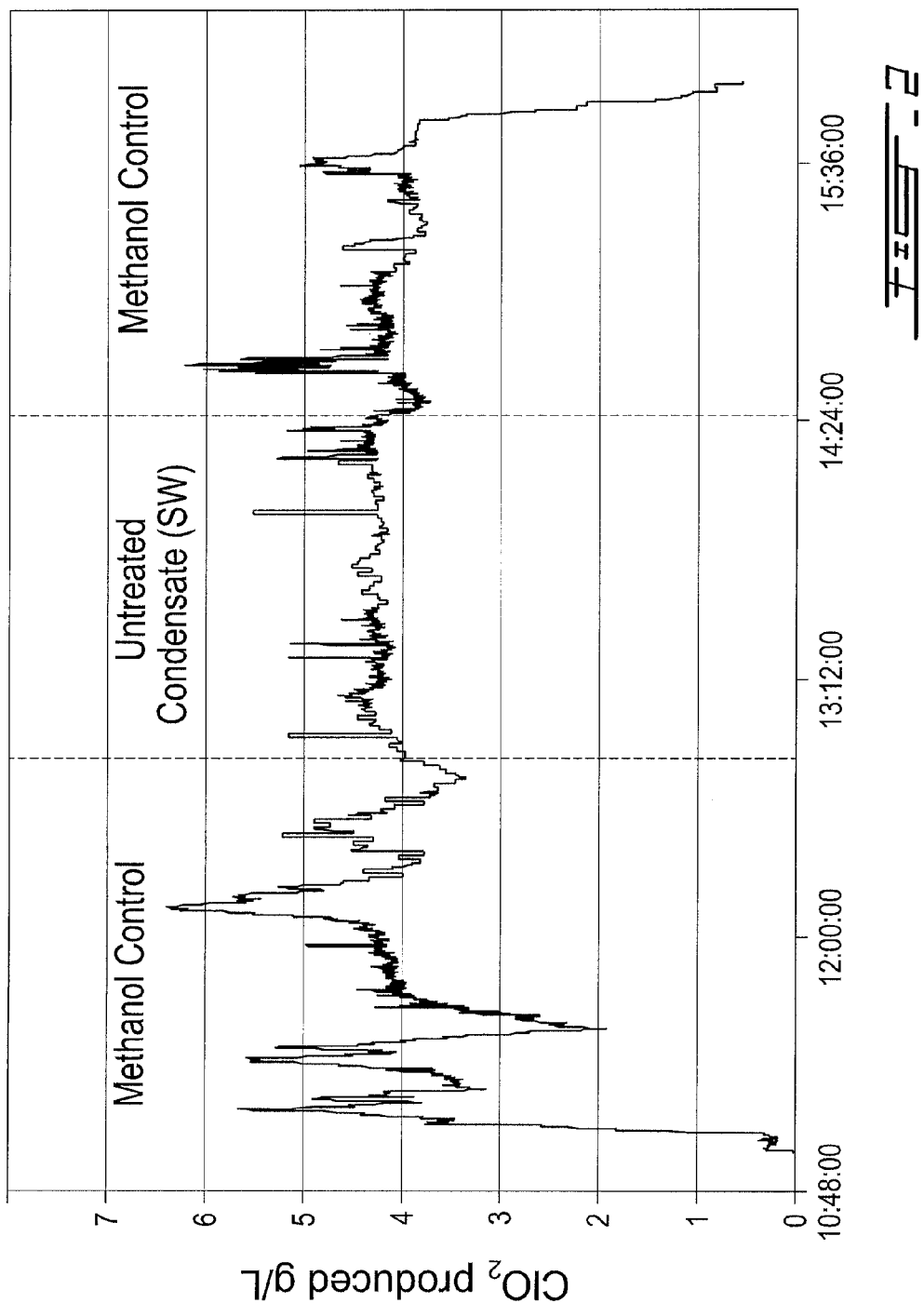

USE OF CHEMICAL PULP MILL STEAM STRIPPER OFF GASES CONDENSATE AS REDUCING AGENT IN CHLORINE DIOXIDE PRODUCTION

CROSS-REFERENCE TO RELATED APPLICATIONS

This application is a National entry of PCT/CA2008/002010 filed Nov. 12, 2008, in which the United States of America was designated and elected, and which remains pending in the International phase until Jun. 26, 2010, which application in turn claims priority under 35 USC 119(e) from U.S. Provisional application Ser. No. 61/006,156 filed Dec. 26, 2007.

TECHNICAL FIELD

The present invention relates to the use of a waste stream, more especially overhead steam stripper off gases from a chemical pulp mill to produce chlorine dioxide. This gaseous stream contains methanol and total reduced sulphur (TRS) compounds, such as hydrogen sulphide, which, once condensed to the liquid form, can act as reducing agents in the chlorine dioxide generator thereby eliminating the need for purchased methanol and providing a new approach for dealing with the disposal of TRS-rich steam stripper off gases.

BACKGROUND ART

Condensates from the digester or the evaporation areas of a kraft pulp mill are contaminated with volatile organics, sulfur-containing components, fibers, and black liquor carryover. More than 60 different compounds have been detected in foul evaporator condensate from a kraft pulp mill. The major pollutants of concern are total reduced sulfur (TRS) compounds and methanol. The main TRS components are: hydrogen sulphide ($H_2S$), methyl mercaptan ($CH_3SH$), dimethyl sulphide ($CH_3SCH_3$) and dimethyl disulphide ($CH_3SSCH_3$). Other organic compounds found in digester and evaporator condensates include: ethanol, acetone, methyl ethyl ketone, terpenes, phenolics, and resin acids. A typical kraft mill produces about 7 to 15 kg of methanol per ton of pulp.

Due to the presence of TRS compounds, the foul condensate cannot be used within the mill. Mills which sewer a portion of their condensates must increasingly deal with several problems such as: additional BOD loading to the effluent treatment system, emission of odorous compounds and cooling of the condensates before discharge. Several treatments such as biological treatment, thermal oxidation and chemical oxidation have been devised to remove TRS and methanol from this stream. U.S. Pat. No. 6,579,506, for example, dealt with the chemical oxidation of a gas stream containing the above TRS compounds using chlorine dioxide solution.

Steam stripping technology has been the predominant choice for most mills for the treatment of foul condensate. In a steam stripper, the foul condensate is fed close to the centre of the stripping column after being heated by the clean condensate exiting the stripper. Steam is fed into the bottom of the column. The upper part of the column acts as a rectifier that separates and concentrates the condensable from the non-condensable gases. Stripping takes place in the bottom section of the column. The stripped gases are cooled in a reflux condenser and the condensate is collected in a reflux tank. The stripper-off gases are separated and sent to be burnt in a kiln, a boiler or an incinerator. The liquid portion is fed back to the column from the top. Incineration is an expensive approach for the disposal of methanol and TRS-rich gaseous streams since it requires a considerable amount of energy and a scrubber for the generated $SO_2$. In addition, methanol, a valuable chemical, is destroyed.

At several kraft pulp mills, purchased methanol is used in the chlorine dioxide generator as a reducing agent for the production of chlorine dioxide.

In such generators, sodium chlorate, sulphuric acid and methanol are mixed together and reacted under certain well-defined conditions to yield $ClO_2$. There exist several patents on the production of $ClO_2$ using pure methanol under various operating conditions. These include: U.S. Pat. No. 5,676,920, U.S. Pat. No. 5,066,477, U.S. Pat. No. 4,473,540, U.S. Pat. No. 4,465,658 and U.S. Pat. No. 4,145,401.

As mentioned before, the steam stripper-off gases are rich in methanol and TRS compounds. No value-added uses of this stream have been suggested or investigated in the prior art. Only destruction approaches have been considered to address the odour and toxicity issues associated with the TRS components.

Similar problems arise with condensates from other classes of chemical pulp mill, for example sulphite pulp mills.

DISCLOSURE OF THE INVENTION

It is an object of the invention to provide a process of generating chlorine dioxide in a reaction having a reducing agent derived from off gases of a chemical pulp mill.

It is another object of the invention to provide a process of generating chlorine dioxide exploiting a condensate of steam stripper off gases of a chemical pulp mill.

It is still another object to provide a use for off gases of a chemical pulp mill in a reaction for generation of chlorine dioxide.

It is yet another object of the invention to provide a methanol-rich condensate of off gases of a chemical pulp mill for use as a reducing agent in the generation of chlorine dioxide.

In accordance with one aspect of the invention, there is provided in a process of generating chlorine dioxide in a reaction having a reducing agent, the improvement wherein the reducing agent comprises a methanol-rich condensate derived from off gases of a chemical pulp mill.

In accordance with another aspect of the invention, there is provided a process of generating chlorine dioxide comprising: reacting a metal chlorate and a mineral acid in the presence of a reducing agent, with evolution of chlorine dioxide, said reducing agent comprising a methanol-rich condensate of steam stripper off gases of a chemical pulp mill.

In accordance with yet another aspect of the invention, there is provided a process of generating chlorine dioxide comprising;
a) providing a methanol rich condensate of overhead steam stripper off gases from pulp manufacture;
b) feeding said condensate to a chlorine dioxide generator; and
c) reacting a metal chlorate and a mineral acid in the presence of said condensate as a reducing agent, in said generator, with evolution of chlorine dioxide.

In accordance with still another aspect of the invention, there is provided a process of pulp manufacture comprising;
i) digesting wood pulp in a pulp mill to produce a pulp;
ii) recovering from said pulp mill a methanol rich condensate of overhead steam stripper off gases;
iii) feeding said condensate to a chlorine dioxide generator, reacting a metal chlorate and a mineral acid in the presence of said condensate as a reducing agent, in said generator, with evolution of chlorine dioxide; and iv) bleaching pulp from said pulp mill with said chlorine dioxide.

In accordance with another aspect of the invention, there is provided use of off gases of a chemical pulp mill to produce a methanol-rich condensate as a reducing agent in a reaction for generation of chlorine dioxide.

In accordance with another aspect of the invention, there is provided a methanol-rich condensate of off gases of a chemical pulp mill for use as a reducing agent in the generation of chlorine dioxide.

In the aforementioned aspects of the invention, the chemical pulp mill may, in particular embodiments, be a kraft pulp mill or a sulphite pulp mill.

BRIEF DESCRIPTION OF THE DRAWINGS

FIG. 2 illustrates graphically results for generation of chlorine dioxide with methanol-rich condensates of the invention, and pure methanol for comparison purposes. The methanol-rich condensate was from a softwood kraft pulp mill.

DETAILED DESCRIPTION OF THE DRAWINGS

Figure 1:
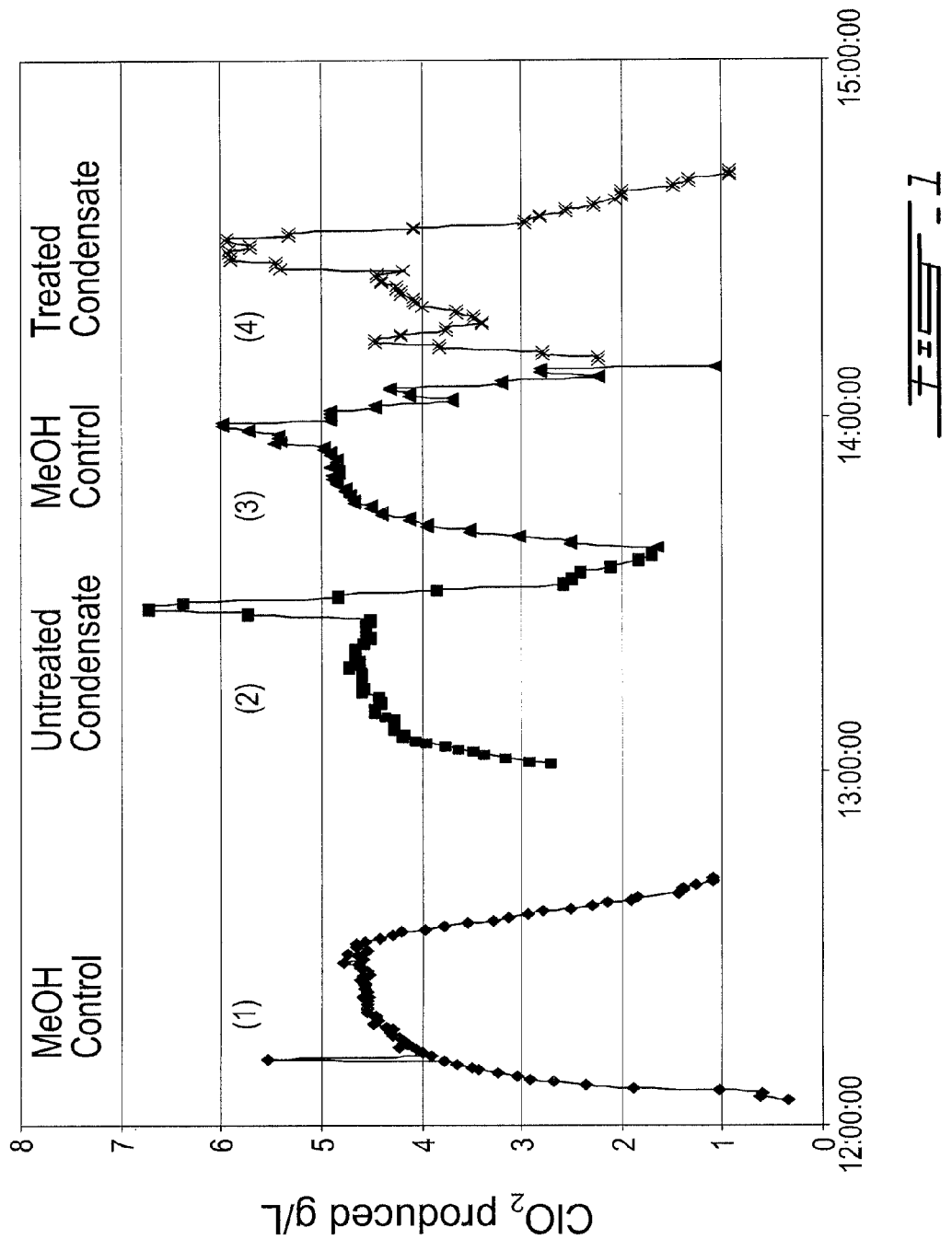
FIG. 1 illustrates graphically results for generation of chlorine dioxide with methanol-rich condensates of the invention, and pure methanol for comparison purposes. The methanol-rich condensate was from a hardwood kraft pulp mill.

FIG. 1 shows results obtained relating to the rate of chlorine dioxide produced using a chlorine dioxide pilot plant (operated by Paprican) in the three cases examined. The first curve (1) on the left, was obtained using pure methanol as a reducing agent (control case). The second curve (2) was generated when untreated condensate (steam stripper off gas condensate) from a hardwood kraft pulp mill was used. The third curve (3) was obtained when pure methanol was again used (control case). The fourth curve (4) presents the $ClO_2$ rate when treated steam stripper off condensate from a hardwood kraft pulp mill was used.

FIG. 2 shows results related to the rate of chlorine dioxide produced using a chlorine dioxide pilot plant (operated by Paprican). The first left portion of the graph was generated using pure methanol as a reducing agent. The second middle portion (between the two vertical lines) was generated when untreated condensate (steam stripper off gas condensate) from a softwood kraft pulp mill was used. The third portion on the right was obtained when pure methanol was used again.

DETAILED DESCRIPTION OF THE INVENTION

The present invention relates to a new use for the methanol and TRS-rich condensate stream obtained from the steam stripper-off gases within a chemical pulp mill. It is found that chemical pulp mills using a steam stripper to treat foul condensate can produce sufficient methanol quantities to meet the requirements of the chlorine dioxide generator which generates chlorine dioxide for bleaching the chemical pulp produced by the pulp mill. This allows pulp mills to reduce or eliminate the consumption of purchased methanol while eliminating or reducing the operational costs associated with any foul condensate disposal including TRS dedicated incinerator or other TRS treatment device.

This invention deals with the condensation and use of a gaseous stream rich in methanol and TRS compounds from a steam stripper at a chemical pulp mill, in a chlorine dioxide generator to produce $ClO_2$ which chlorine dioxide may be employed for bleaching the pulp from such pulp mill. In this approach, the steam stripper off gases are condensed using a condenser to obtain a methanol-rich solution containing dissolved TRS compounds and other volatile organic compounds. If necessary, this condensed stream can be filtered to remove fibers or any other suspended material. If necessary, the methanol-rich solution can be diluted by the addition of water before sending it to the chlorine dioxide generator. In the generator, sodium chlorate and sulphuric acid are usually mixed with a reducing agent such as methanol to yield $ClO_2$ which is withdrawn under vacuum from the reaction solution and directed to a vessel where it is absorbed in water (absorber). Sodium chloride is usually added as well to reduce $Cl_2$ generation during $ClO_2$ production.

Other metal chlorates, especially alkali metal or alkaline earth metal chlorates may be employed, and other mineral acids however sodium chlorate and sulphuric acid are preferred.

It is well known in the prior art that chlorine dioxide can be used to destroy TRS compounds (e.g. hydrogen sulphide). In the methanol-rich stripper off gas condensate, $H_2S$ is the TRS compound dissolved at the highest concentration levels. Despite this fact, when this condensate is used in the chlorine dioxide generator as a reducing agent, in accordance with the invention, the same amount of chlorine dioxide was obtained as was the case with pure methanol (both solutions were used at 20% by weight methanol). In both cases, the methanol was added to the aqueous phase from the bottom of the reactor. In another experiment, the TRS compounds were removed from methanol-rich solution steam stripper off condensate and the TRS-free product was used in the $ClO_2$ generator as a reducing agent. Again, a similar amount of $ClO_2$ was generated as in the previous two cases in which pure methanol and untreated condensate were used. The presence of TRS at these levels in the condensate did not affect the rate of $ClO_2$ production.

In a separate laboratory experiment, $Na_2S$ was added to a mixture of sodium chlorate and sulfuric acid. In the acidic medium of the reaction solution, the $Na_2S$ was converted to $H_2S$. It was found in this experiment that the $H_2S$ acted as a reducing agent generating $ClO_2$. $Na_2S$ is available at kraft pulp mills in green or white liquor and can be used for $ClO_2$ generation after separation from other compounds (NaOH or $Na_2CO_3$). Thus, it can be concluded that TRS compounds present in the methanol-rich steam stripper off condensate stream can enhance the production of $ClO_2$ in the generator or at the very least, maintain it at the levels expected based on the amount of methanol in the condensate.

The novel approach, of the present invention allows pulp mills, for example kraft pulp mills or sulphite pulp mills to reduce or eliminate the consumption of purchased methanol in the $ClO_2$ generator while eliminating or reducing the operational costs associated with any TRS dedicated incinerator or any other treatment method.

The first step in the proposed process involves the condensation of the steam stripper-off gases to liquefy most of the methanol using, for example, at least one condenser. In the case of softwood kraft pulp mills, the stripper-off gases contain a significant amount of terpenes. Upon cooling, the stripper-off condensate consists of two phases. The terpene phase is lighter than the methanol-rich phase and forms the upper phase. Thus, the methanol-rich lower phase can be easily separated before use in the chlorine dioxide generator.

The condensed methanol was found to be contaminated with TRS compounds and other volatile organics (VOCs). The composition of typical streams from hardwood and softwood kraft pulp mills is indicated in Table I. Only major constituents are shown. Hydrogen sulphide has usually the highest concentration in this stream as compared to other TRS components. The level of the TRS and VOC compounds will vary from one mill to another depending on pulp mill operating conditions and the type of wood used.

TABLE I

Methanol and TRS content of steam stripper-off condensate from a hardwood and a softwood kraft pulp mills

| | hydrogen sulfide (mg/L) | methyl mercaptan (mg/L) | dimethyl sulfide (mg/L) | dimethyl disulfide (mg/L) | Methanol (g/L) |
|---|---|---|---|---|---|
| Hardwood | 6073 | 1590 | 2740.6 | 1207.7 | 744.5 |
| Softwood | 9028 | 1478 | 2572 | 83.8 | 210 |

As seen in Table I, the methanol concentration is quite high in these streams. The TRS compounds exist in these streams at rather high levels causing the streams to have a very repelling smell. These compounds can be destroyed by the addition of chemicals, however, such treatments can be very costly and in most cases they could introduce impurities in the stream. Generally, steam stripper-off gases are sent to an incinerator along with the non-condensable gases (NCGs).

In several chlorine dioxide generators (e.g., SVP-LITE®, R8®, Solvay) methanol is used as a reducing agent in the reaction of sodium chlorate and sulphuric acid to produce chlorine dioxide. The reactant concentrations and operating conditions vary depending on the generator type. For example, the $ClO_2$ generating reaction can be represented as follows:

For every nine moles of $ClO_2$ produced, two moles of methanol are consumed. In the composition indicated in Table 1, the TRS compounds represent only about 1.1 to 5 mole % of the methanol. Theoretically the TRS compounds can react with and consume $ClO_2$. If these compounds, however, are allowed to react with sodium chlorate and sulphuric acid prior to escaping from the reaction solution, no decline in chlorine dioxide production should be seen as a result of their presence in the main reducing agent (methanol). This hypothesis was tested in a chlorine dioxide generator pilot plant (operated by Paprican). A mixture of sodium sulphate, sodium chlorate, and sulphuric acid was introduced into the generator at a temperature of about 67° C. A vacuum of about 28 mm Hg was applied. Pure methanol was introduced at a concentration of about 20% by weight. The rate of $ClO_2$ produced was monitored as a function of time as the reaction proceeded. This test represented the baseline and results with other methanol sources (e.g. treated and untreated steam stripper off condensate) were compared to it. The steam stripper off condensate was filtered to remove any suspended solids or fibers. The treated and untreated stripper off condensates were diluted to about 20% and used in the generator under the same conditions as the control case. The treated steam stripper off condensate was obtained by stripping TRS compounds in a hollow fiber contactor. This treatment led to the removal of about 99% of the TRS compounds.

The rate of chlorine dioxide production for the three cases examined is shown in FIG. 1. The concentration of chlorine dioxide produced in each case was on the average about 5 g/L over the same time period. No difference between the three sources of methanol was observed during this trial period. FIG. 2. shows similar results in the case of untreated stripper-off condensate from a softwood kraft pulp mill. Based on this experiment it appears that hydrogen sulphide, the most concentrated TRS compound, may be acting as a reducing agent for chlorine dioxide production; however, this cannot be conclusively deduced from this experiment since the overall $H_2S$ level in the reactor was low.

FIGS. 1 and 2 clearly show that the steam stripper off gas condensate can be used in the production of chlorine dioxide without any major problems. A treated or untreated stream can be employed. The use of the steam stripper off gas condensate in the chlorine dioxide generator can potentially replace all purchased methanol. Generally, in a typical kraft pulp mill, methanol in the condensate from the steam stripper will exceed the requirements of the $ClO_2$ generator. Hence, a portion of the steam stripper off gases will still have to be burned in a dedicated incinerator, recovery boiler, or lime kiln.

When added to the ClO2 generator, the TRS compounds in the steam stripper off gas condensates can potentially:
(a) act as a reducing agent and react with sodium chlorate and sulphuric acid to produce chlorine dioxide; or
(b) react with and consume chlorine dioxide.

To test these hypothesis, a laboratory experiment was devised. A 0.25 L solution which was 8.0 N in $H_2SO_4$, 2.0 M in $NaClO_3$ and 525 g/L in $Na_2SO_4$ was used to produce $ClO_2$. In a first experiment, methanol was used as a reducing agent. In a subsequent experiment, sodium sulphide, $Na_2S$, was used as a reducing agent instead of methanol. In each case, methanol or $Na_2S$ was added slowly to the bottom of the reaction mixture. Since both $H_2S$ and methanol are quite volatile, they need to be added to the solution in such a fashion as to participate in the reaction before being volatilized. A vacuum of about −26 mm Hg allowed the transfer of the $ClO_2$ produced to an aqueous cold solution which was analysed at the end of the reaction. Table II presents the results from these laboratory trials performed at 68° C. Under the same experimental conditions, the molar ratio of $ClO_2$ to $Na_2S$ added was slightly higher than that of $ClO_2$ to methanol added. It is known that when $Na_2S$ is added to an acidic solution, $H_2S$ is generated. In the gaseous form, $H_2S$ and other TRS compounds react with $ClO_2$ at ratios varying from 1:1 to 1:3. However, the generation of $H_2S$ in this case did not affect the $ClO_2$ formation rate. In fact, based on the results obtained, $H_2S$ seems to be a slightly better reducing agent than methanol under the conditions of this experiment. The addition of $Na_2S$ has to be conducted slowly to avoid a vigorous reaction between the acid and $Na_2S$ which may cause the $H_2S$ to escape rapidly from the solution and consume $ClO_2$.

Based on these findings, $H_2S$ appears to be acting more like a reducing agent in the production of $ClO_2$ (hypothesis a) rather than consuming chlorine dioxide (hypothesis b). Therefore, the presence of $H_2S$ (and other TRS compounds) in the steam stripper off gases condensate could enhance $ClO_2$ production.

TABLE II $ClO_2$ generation using methanol and $Na_2S$ as reducing agents

| Reducing agent | Molar ratio of $ClO_2$ produced to reducing agent added |
|---|---|
| Methanol | 0.59 |
| $Na_2S$ | 0.64 |

The results obtained, demonstrate that the present invention provides a value-added use of steam stripper off gas condensate at chemical pulp mills such as kraft pulp mills while simultaneously providing an alternative approach for the disposal of a TRS-rich stream.

The invention claimed is:

1. In a process of generating chlorine dioxide in a reaction having a reducing agent, the improvement wherein the reducing agent comprises a methanol-rich condensate derived from steam stripper off gases of a chemical pulp mill, said condensate containing the methanol and total reduced sulphur compounds of said steam stripper off gases.

2. The process of claim 1, wherein said total reduced sulphur compounds comprise hydrogen sulphide, methyl mercaptan, dimethyl sulphide and dimethyl disulphide.

3. The process of claim 1, wherein said reaction is of a chlorate and an acid.

4. The process of claim 3, wherein said chlorate is sodium chlorate and said acid is sulphuric acid.

5. The process of claim 1, wherein said chemical pulp mill is a kraft pulp mill.

6. The process of claim 1, wherein said chemical pulp mill is a sulphite pulp mill.

7. A process of generating chlorine dioxide comprising;
reacting a metal chlorate and a mineral acid in the presence of a reducing agent, with evolution of chlorine dioxide, said reducing agent comprising a methanol-rich condensate and total reduced sulphur compounds of steam stripper off gases of a chemical pulp mill.

8. A method according to claim 7, wherein said metal chlorate is an alkali metal chlorate.

9. A method according to claim 8, wherein said chlorate is sodium chlorate and said acid is sulphuric acid.

10. A method of claim 7, wherein said total reduced sulphur compounds comprise hydrogen sulphide, methyl mercaptan, dimethyl sulphide and dimethyl disulphide.

11. The process of claim 7, wherein said pulp mill is a kraft pulp mill.

12. The process of claim 7, wherein said pulp mill is a sulphite pulp mill.

13. A process of generating chlorine dioxide comprising;
a) providing a methanol-rich condensate of overhead steam stripper off gases from pulp manufacture in a chemical pulp mill, said condensate containing the methanol and total reduced sulphur compounds of said overhead steam stripper off gases;
b) feeding said condensate to a chlorine dioxide generator; and
c) reacting a metal chlorate and a mineral acid in the presence of said condensate as a reducing agent, in said generator, with evolution of chlorine dioxide.

14. A process of pulp manufacture comprising;
i) digesting wood pulp in a pulp mill to produce a pulp;
ii) recovering from said pulp mill a methanol-rich condensate of overhead steam stripper off gases, said condensate containing total reduced sulphur compounds of said overhead steam stripper off gases;
iii) feeding said condensate to a chlorine dioxide generator, reacting a metal chlorate and a mineral acid in the presence of said condensate as a reducing agent, in said generator, with evolution of chlorine dioxide; and
iv) bleaching pulp from said pulp mill with said chlorine dioxide.

15. A method according to claim 14, wherein said chlorate is sodium chlorate and said acid is sulphuric acid.

16. A method of claim 15, wherein said sulphur compounds comprise hydrogen sulphide, methyl mercaptan, dimethyl sulphide and dimethyl disulphide.

17. The process of claim 16, wherein said pulp mill is a kraft pulp mill.

* * * * *